United States Patent [19]

Allen et al.

[11] Patent Number: 4,523,842
[45] Date of Patent: Jun. 18, 1985

[54] ASPERIC SURFACE TEST FIXTURE

[75] Inventors: Edwin M. Allen; Eugene C. Foust; Steven A. Sievert; William C. Fitzgerald; Max L. Moffitt, all of Ridgecrest, Calif.

[73] Assignee: The United States of America as represented by the Secretary of the Navy, Washington, D.C.

[21] Appl. No.: 476,748

[22] Filed: Mar. 18, 1983

[51] Int. Cl.³ .................. G01M 11/02; G01N 21/55
[52] U.S. Cl. ............................ 356/124; 356/125
[58] Field of Search ................. 356/124, 124.5, 121, 356/122, 123, 125, 126, 127, 445, 448

[56] References Cited

U.S. PATENT DOCUMENTS

| | | | |
|---|---|---|---|
| 3,734,626 | 5/1973 | Roberts et al. | 356/124 |
| 3,736,060 | 5/1973 | Mayo | 356/124 |
| 3,947,127 | 3/1976 | Bennett et al. | 356/124 |
| 3,977,789 | 8/1976 | Hunter et al. | 356/120 |
| 4,046,463 | 9/1977 | La Russa et al. | 351/13 |
| 4,089,607 | 5/1978 | Rambauske | 356/109 |
| 4,149,801 | 4/1979 | Volk | 356/124 |
| 4,241,996 | 12/1980 | Weiser | 356/124.5 |

FOREIGN PATENT DOCUMENTS 267084  7/1970  U.S.S.R. .................. 356/124
450077  4/1975  U.S.S.R. .................. 356/124

*Primary Examiner*—R. A. Rosenberger
*Assistant Examiner*—Michael F. Vollero
*Attorney, Agent, or Firm*—Robert F. Beers; W. Thom Skeer; Kenneth G. Pritchard

[57] ABSTRACT

An optic surface apparatus capable of handling aspheric surfaces uses direct measurement of the blur circle of the image created by the test surface. Direct measurement of the blur circle is obtained by providing a collimated light beam which includes the test surface in its optical path to an ultimate focal point. The focal point is occupied by an apertured screen with apertures of varying diameter. A light detector is placed behind the apertured screen to measure the intensity of light as a function of aperture size. The apertured screen and detector are mounted on a three-axis translator. For apertures less than the effective diameter of the blur circle, less than 100% light is received by the detector. For apertures equal to or greater than the effective diameter of the blur circle, 100% of the light reaches the light detector. A folding mirror is used in the optical path to permit the device to be physically compact. Different wavelengths of test energy may be employed provided that appropriate adjustments are made to the corrector lens and detector choice.

11 Claims, 4 Drawing Figures

ASPERIC SURFACE TEST FIXTURE

BACKGROUND OF THE INVENTION

1. Field of the Invention

The present invention relates to optical testing devices for measuring the quality of image resolution from a given test surface. In particular, the present invention is designed for measuring the image resolution of aspheric mirror surfaces.

2. Description of the Prior Art

Previous optical surface test fixtures relied on indirect measurement of the quality of the image produced. The standard testing device was the Zygo interferometer, Fizeau type. The Zygo interferometer, in addition to its time consuming evaluation of a split beam monochromatic light interference pattern reflected off of the test surface, provides a surface figure measurement and does not produce an actual measurement of the blur circle size.

In addition to interferometric techniques, the quality of the test surface has frequently been measured by measuring the amount of normal incident scattered light to random scattered light to determine the percentage of light maintained within the beam. Again, this does not provide a precise measurement of the size of the blur circle. This technique measures mirror quality rather than mirror figure. In general, aspheric surfaces have not been used in optical devices because they have been hard to fabricate and, once fabricated, it is hard to measure the image quality with any degree of certainty.

SUMMARY OF THE INVENTION

Light from a collimated light source or a coherent light source such as a laser system, is expanded and chopped to provide a fixed modulated light beam. The light is reflected from a folding mirror, refracted through a corrector lens, reflected off the test mirror, and then reflected off a secondary mirror to a focal plane. The corrector lens is optically equivalent to the remainder of the optical system without the aspheric primary mirror. Within the focal plane, a three-axis translator supports an apertured plate or apertured screen which has apertures of several known diameters. Placed behind the apertured plate is a detector which permits a direct readout of light incident on the detector.

In operation, the apertured plate is translated through at least three positions so that the focused light beam passes through the different sized apertures. For apertures less than the effective size of the blur circle, the detector output will be reduced by the amount of light not passing through the aperture. For an aperture equal to or slightly greater than the size of the blur circle, 100% of the focused light beam will be incident on the detector. For all apertures larger than this, the same amount of light will be incident on the detector. Thus, the readout of the light detector will permit an exact determination of the effective size of the blur circle created by the test surface. This provides true go-no-go acceptance or rejection capability for optimum cost effectiveness in a production mode.

DESCRIPTION OF THE PREFERRED EMBODIMENT

Figure 1:
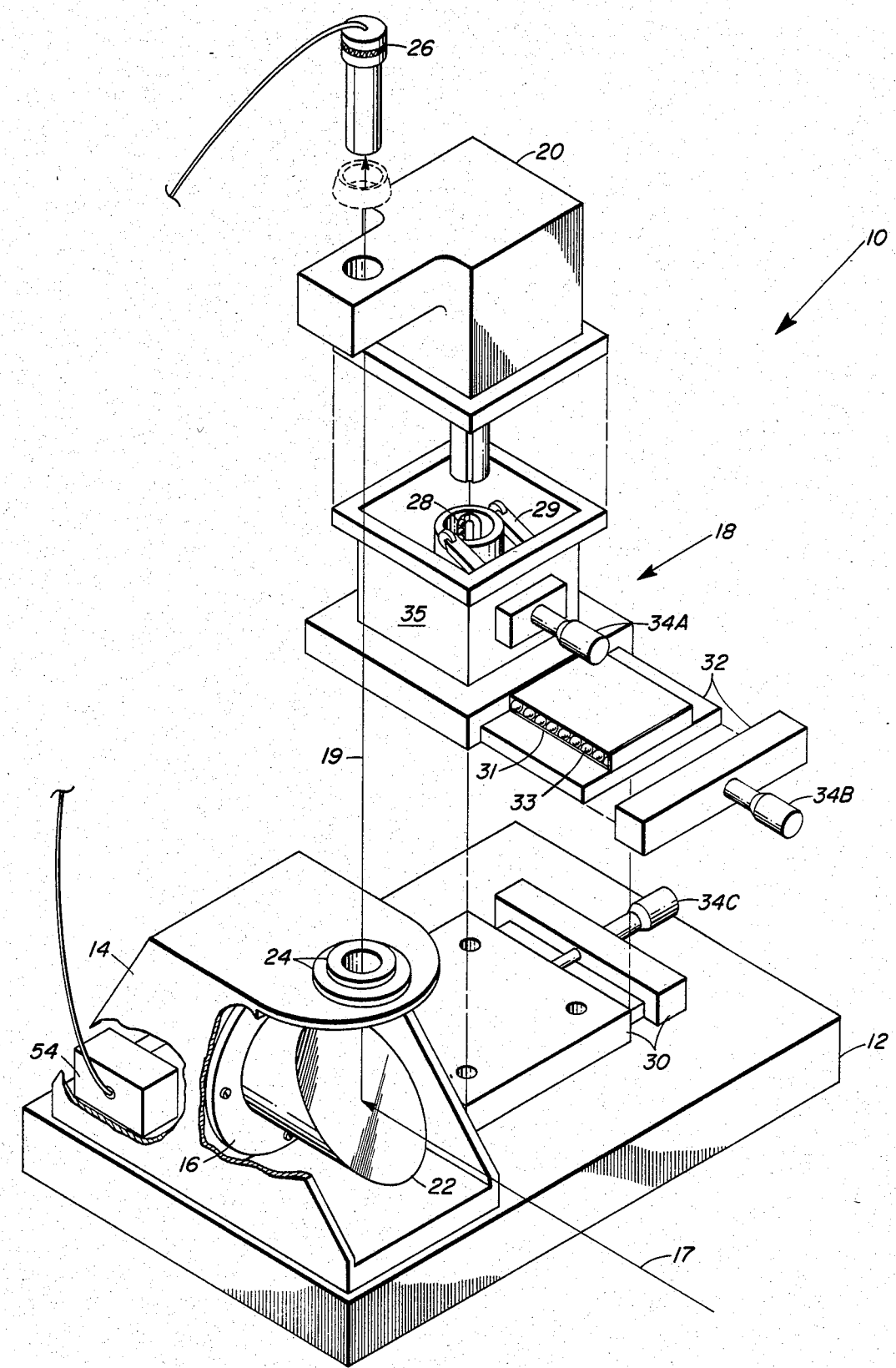
FIG. 1 is a perspective of the present invention with cutaway sections.

In FIG. 1, an example of an aspheric surface test fixture 10 is shown. Test fixture 10 is mounted on a surface plate 12 via screws or other fastening devices. Test fixture 10 has an optical housing subassembly 14 which is used to hold a mirror mount 16. Mirror mount 16 in turn holds a folding mirror 22 which permits incoming light along path 17 to be reflected. Mounted to surface plate 12 is a three-axis translator 18. Translator 18 supports a detector holder 20 mounted to translator 18 via screws, bolts, or any other suitable rigid fastening method. Detector holder 20 holds detector and aperture plate subassembly 26. Three-axis translator 18 has a Z-axis translator 35, a X-axis translator 30, and a Y-axis translator 32.

Three-axis translator 18 has a ball bushing 28 which is moved by a lever 29 connected to a vernier drive 34A. As vernier drive 34A moves back and forth, lever 29 moves detector holder 20 either up or down. For purposes of description, this up and down motion will be referred to as motion along the Z-axis. Mounted near the base of Z-axis translator 35 are two orthogonally mounted means for moving Z-axis translator 35 in directions that would correspond to X and Y directions. This is done by X-axis translator 30 and Y-axis translator 32. Each of the translators is in turn moved by a vernier drive 34B and 34C respectively, as the Z-axis is. In this case inclined plane 29 is replaced by a roller guided track 31 which uses ball bearings 33 to slide in a given axis direction as the vernier drive for that axis is screwed either in or out. Three-axis translator 18 thus serves as a means for moving within an X-Y plane, such as a focal plane, and a means for moving along the Z-axis, such as adjusting the focal distance to such a focal plane.

Figure 2:
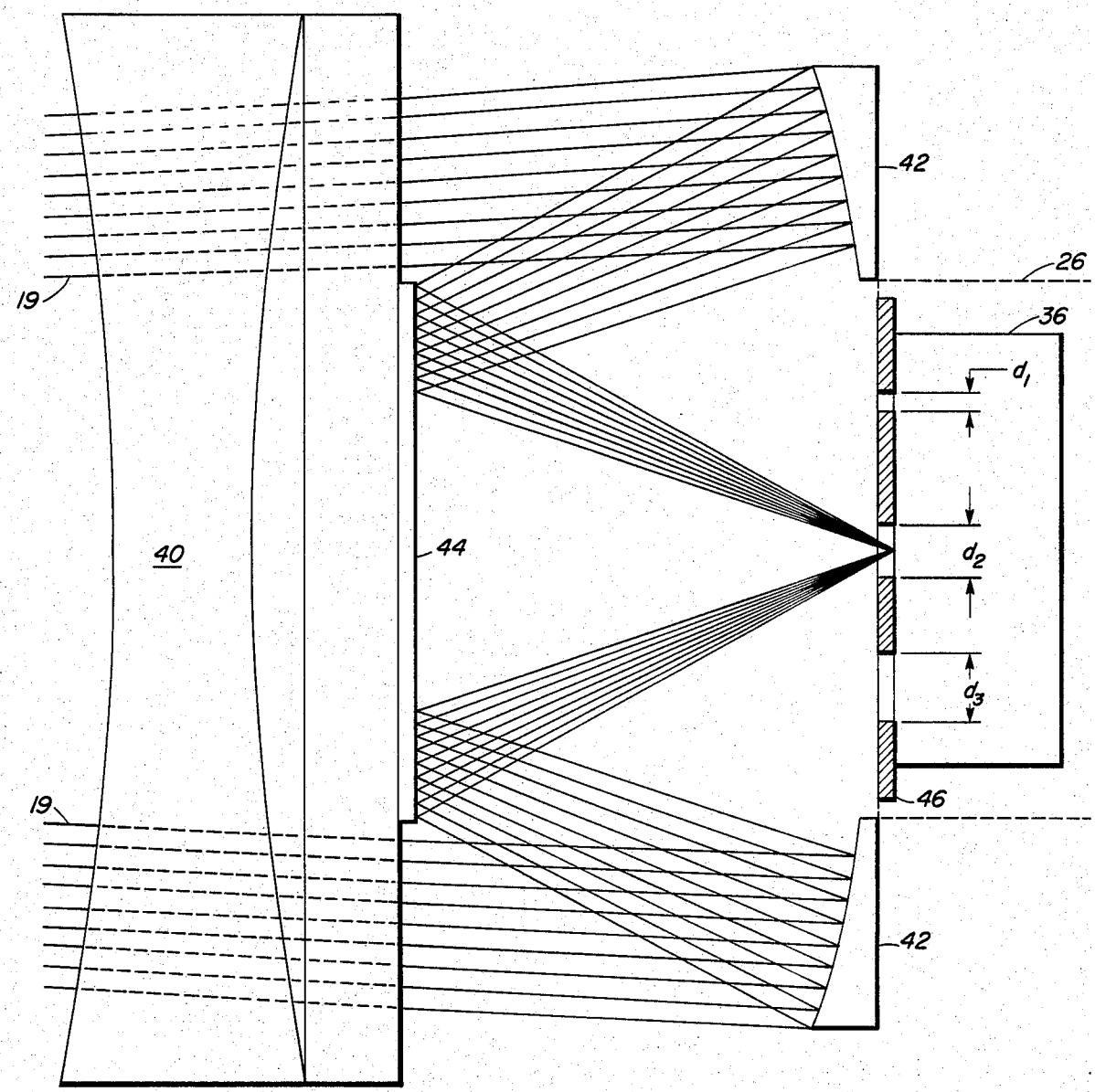
FIG. 2 shows a typical beam path with the light rays refracting through the corrector lens, reflecting off the test mirror, reflecting off the plane folding mirror on the corrector lens, focusing on the aperture plate, and passing through to the detector.
Figure 3:
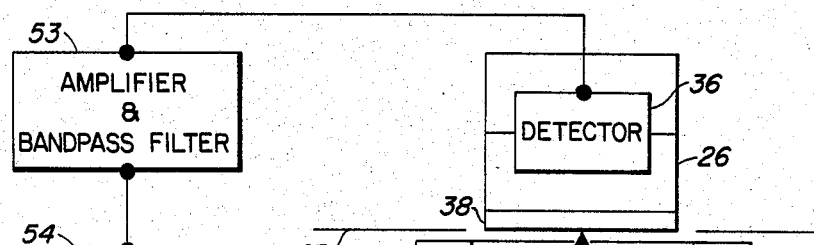
FIG. 3 is an overall ray trace path of the present invention.
Figure 3:
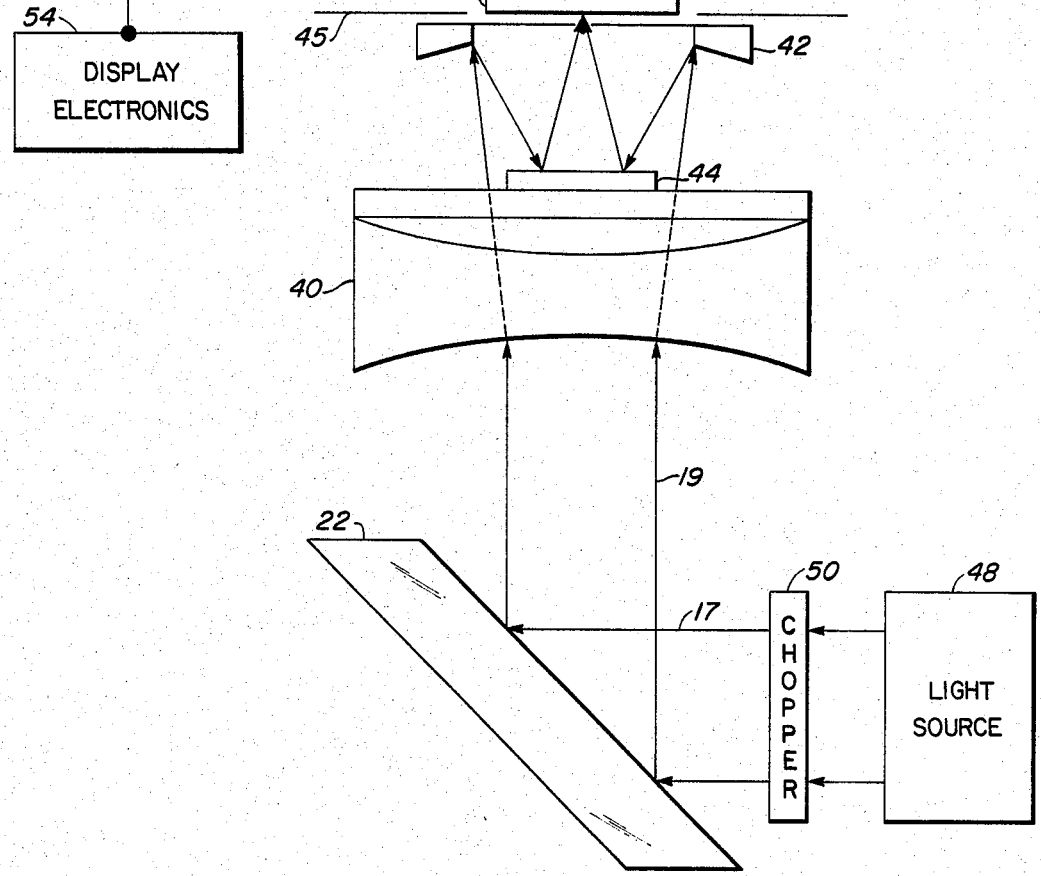

FIG. 2 shows the relationship of light passing between folding mirror 22, in FIG. 3, and detector and aperture plate subassembly 26. This optical path is represented in FIG. 1 by light beam 19 which represents incoming light 17 after reflection from the folding mirror. In FIG. 2, reflected light beam 19 passes through a corrector lens 40.

Corrector lens 40 corrects for chromatic aberration over the spectral band width of interest, and also corrects for the spherical aberration of the test mirror. A secondary folding mirror 44 is formed by depositing a reflecting material on the plane surface of corrector lens 40. Light beam 19 is refracted through corrector lens 40, reflected off test mirror 42, reflected off folding mirror 44, and focused on an apertured screen 46. A holder 24, shown in FIG. 1, may be used to provide a fixed mounting for corrector lens 40, test mirror 42 and folding mirror 44. Apertured screen 46 has a number of various sized holes with characteristic diameters, $d_i$. Apertured screen 46 may be a metal plate with various sized holes drilled in the plate. Located behind apertured screen 46 is a light detector 36 which may be a lead sulphide photodetector for optical or near infrared wavelength. Depending on the wavelength of light present, the ideal choice of detector 36 varies. In general, detector 36 should be chosen to match the light source used to create light beam 19.

FIG. 3 is an electro-optical schematic of the present invention. Light from a light source 48, such as a quartz halogen light source, emits light along an optical path 17. Placed in the midst of optical path 17 is a chopper 50 which can be a spoked wheel attached to a motor, not shown. The chopper rotates at a fixed rate of revolution. The modulated collimated light reflects off of folding mirror 22 and passes through corrector lens 40.

The output signal of detector 36 is fed to processing electronics 53 which include an amplifier and a bandpass filter. The amplifier increases the magnitude of the detected signal to a level usable for display electronics 54. The bandpass filter rejects spurious signals and noise which have frequencies significantly different than a preselected center frequency. Chopper 50 is tuned to the same center frequency. This permits the device to avoid background noise when the surface is being tested.

Display electronics 54 may be an oscilloscope or chart recorder where the effect of chopped light on detector 36 results in a sinusoidal output. This sinusoidal output is tuned by three-axis translator 18 for any given aperture in apertured screen 46. In particular, the exact location of focal plane 45, Z-axis position, might vary slightly because of surface variation in the aspheric mirrors being tested.

Figure 4:
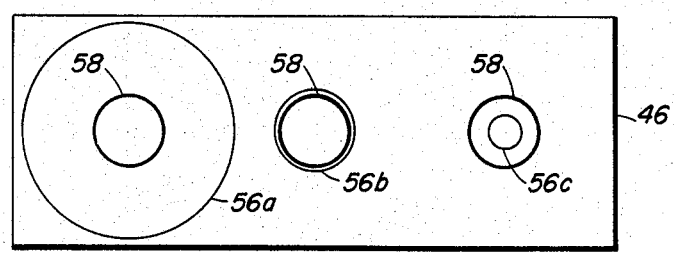
FIG. 4 shows the relation of varying sized apertures to a blur circle for the present invention.

FIG. 4 shows three aperture sizes 56A, 56B, and 56C which respectively go from largest to smallest. A blur circle 58 is shown superimposed on each of the three apertures 56A, 56B, and 56C. As shown, the relationship between aperture 56A and blur circle 58 is such that the entire blur circle passes within aperture 56A of apertured screen 46. Thus, detector 36 will carry its maximum possible output because it is receiving all light contained within blur circle 58. Aperture 56B is shown to be slightly larger than blur circle 58, and as a result, by adjusting the various vernier drives 34A, 34B, and 34C, shown previously, the same intensity of output from detector 36 is possible because all of blur circle 58 is still permitted to pass through aperture 56B. The third example, with aperture 56C, shows that it is impossible for all of blur circle 58 to pass through the aperture. As a result, the detector output will be restricted to that percentage of light that the area of aperture 56C represents to blur circle 58, assuming uniform light distribution within the blur circle. Even if light intensity distribution is not uniform across the blur circle, the size of the blur circle can still be established to a high degree of accuracy provided that there are enough apertures of differing effective diameters to permit a very close match to the size of the blur circle as shown by aperture 56B. For further definition of intensity within the blur circle beam, smaller apertures may be used to find the maximum intensity possible within a given fraction of the area of blur circle 58.

The largest aperture of apertured screen 46 is positioned at the focal point for the test optics. Apertured screen 46 is then repositioned so that the focal point passes through successively smaller apertures. The various energy levels measured by the detector are compared and the mirror quality is determined. Comparative readings taken from a known quality aspheric mirror permit other aspheric mirrors to be evaluated by the ratio of signal levels for the different apertures.

It is obvious to those skilled in the art that modifications to the above invention may be made.

What is claimed is:

1. A fixture for testing a primary mirror surface test specimen comprising:
   a light source for emitting a light beam along a predetermined optical path;
   means for positioning said primary mirror surface test specimen in said optical path;
   a corrector lens placed in said optical path between said light source and said positioning means;
   a secondary mirror placed in the optical path of light reflected from said primary mirror surface, said secondary mirror re-reflecting said light along an extension of said optical path to a focal plane;
   a light detector placed in the extension of said optical path;
   a screen having a plurality of apertures, each aperture having a characteristic size, placed in said focal plane and between said secondary mirror and said light detector; and
   a translator connected to said screen.

2. A fixture for testing a primary mirror surface test specimen as described in claim 1 further comprising a folding mirror in the optical path between said light source and said positioning means.

3. A fixture for testing a primary mirror surface test specimen as described in claim 1 further comprising means for chopping said emitted light beam from said light source.

4. A fixture for testing a primary mirror surface test specimen as described in claim 2 further comprising means for chopping said emitted light beam from said light source.

5. A fixture for testing a primary mirror surface test specimen as described in claim 1 where said translator comprises:
   three orthogonal tracks holding said screen; and
   three vernier drives, one along each of said tracks.

6. A fixture for testing a primary mirror surface test specimen as described in claim 2 where said translator comprises:
   three orthogonal tracks holding said screen; and
   three vernier drives, one along each of said tracks.

7. A fixture for testing a primary mirror surface test specimen as described in claim 3 where said translator comprises:
   three orthogonal tracks holding said screen; and
   three vernier drives, one along each of said tracks.

8. A fixture for testing a primary mirror surface test specimen as described in claim 4 where said translator comprises:
   three orthogonal tracks holding said screen; and
   three vernier drives, one along each of said tracks.

9. A fixture for testing a primary mirror surface test specimen as described in claim 1 further comprising:
   processing electronics connected to said light detector; and
   display electronics connected to said processing electronics.

10. A fixture for testing a primary mirror surface test specimen as described in claim 4 further comprising:
    processing electronics connected to said light detector; and
    display electronics connected to said processing electronics.

11. A fixture for testing a primary mirror surface test specimen as described in claim 8 further comprising:
    processing electronics connected to said light detector; and
    display electronics connected to said processing electronics.

* * * * *